May 2, 1933.  T. C. MOORSHEAD ET AL  1,907,361

GLASS FURNACE

Filed Feb. 19, 1931  2 Sheets-Sheet 1

INVENTORS:
Thomas Courtney Moorshead
and Francis Augustus Hurlbut

ATTORNEY

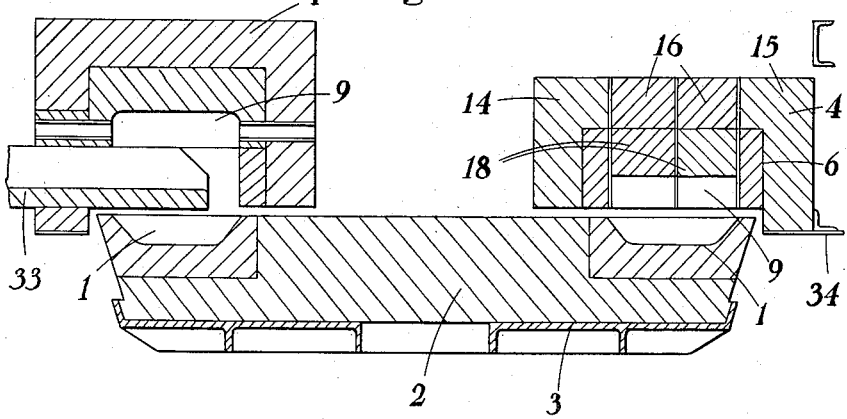
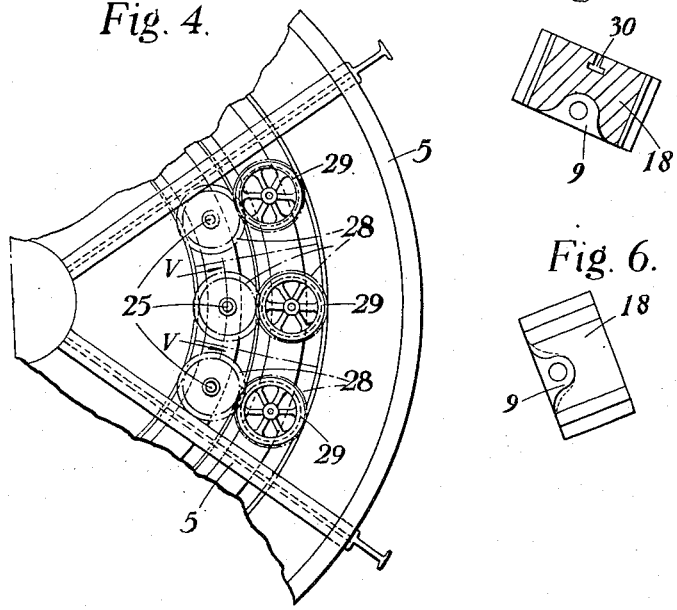

Patented May 2, 1933

1,907,361

UNITED STATES PATENT OFFICE

THOMAS COURTNEY MOORSHEAD AND FRANCIS AUGUSTUS HURLBUT, OF LONDON, ENGLAND, ASSIGNORS TO THE UNITED GLASS BOTTLE MANUFACTURERS LIMITED, OF LONDON, ENGLAND, A BRITISH COMPANY

GLASS FURNACE

Application filed February 19, 1931, Serial No. 517,022, and in Great Britain April 22, 1930.

This invention relates to glass furnaces and particularly to that type of glass furnace which comprises a pot or container mounted so as to be capable of rotary movement about a vertical axis. The chief object of the present invention is to provide an improved form of furnace which will enable the temperature of the molten glass to be accurately and conveniently controlled.

According to the invention, the furnace comprises a rotary pot or container for the molten glass equipped with a plurality of independent heating means. The container preferably comprises an annular trough formed in a block of refractory material and having a plurality of heating chambers arranged with their lower ends open and disposed above the glass in the trough. For heating the chambers, an electric heating element of the resistance type may be located within each chamber, although arc or induction heaters, or even gas, oil or other fuel burners, may be used for this purpose, if desired. When it is desired to vary the temperature of the molten glass, as is required for different kinds of glassware, the number of chambers which are heated may be varied; that is to say, if for example the temperature of the molten glass is required to be reduced the heating devices for one or more of the chambers may be rendered inoperative. Instead of, or in addition to, this manner of varying the temperature, the chambers may be capable of vertical adjustment, either independently or all together, so that the distance between the chambers and the upper surface of the molten glass may be varied with a consequent variation in the temperature of the glass. Means may also be provided, if desired, for controlling the heating devices so that the temperature of all the chambers is varied simultaneously and to the same or different extents.

In order that the said invention may be clearly understood and readily carried into effect, the same will now be more fully described with reference to the accompanying drawings which illustrate, by way of example, one convenient mode of carrying the invention into effect and in which:—

Fig. 3 is a vertical sectional elevation taken on the line III—III of Fig. 2 and at right angles to the view shown in Fig. 1.

Fig. 4 is a fragmentary plan view showing details of the means for raising and lowering the heating chambers.

Fig. 5 is a fragmentary sectional view taken on the line V—V of Fig. 4, showing the shape of the heating chambers, and Fig. 6 is an end view of the block shown in Fig. 5.

Figure 1:
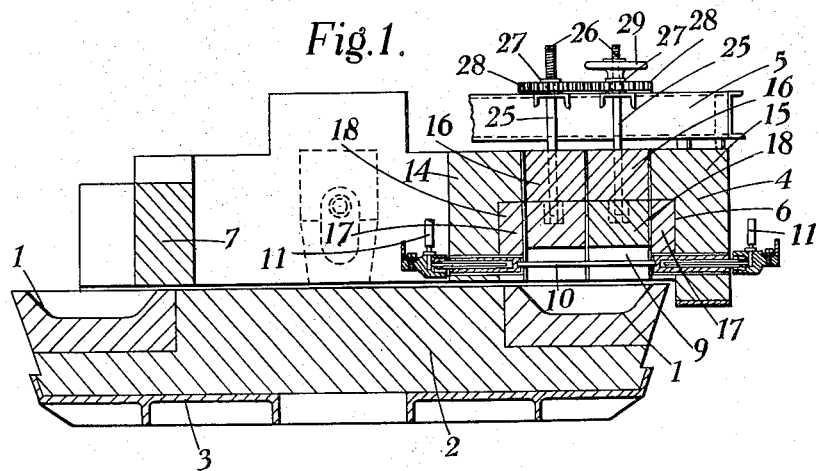
Fig. 1 is a vertical sectional elevation through a furnace embodying the invention.
Figure 2:
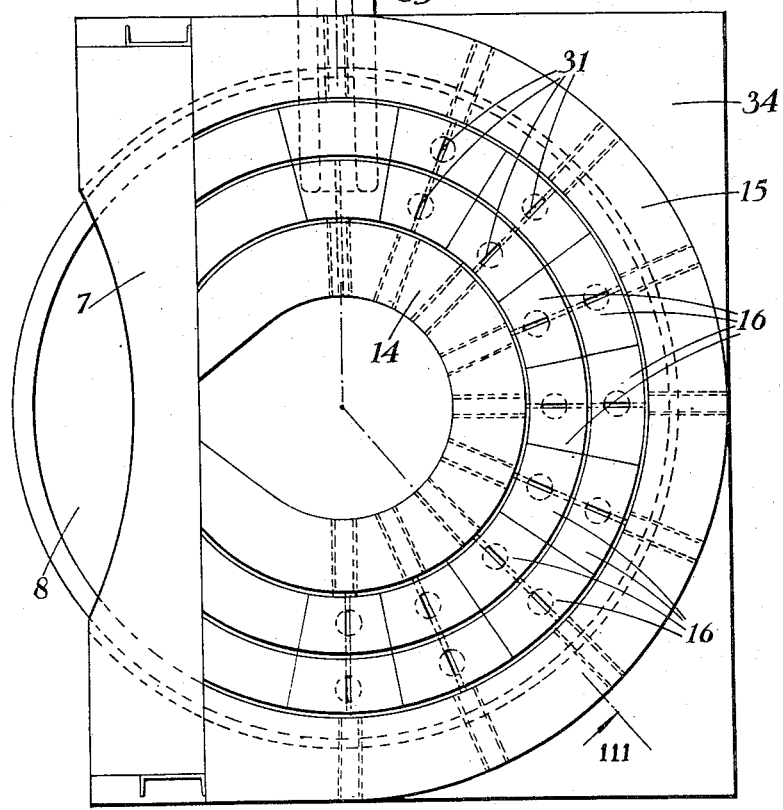
Fig. 2 is a plan view looking on top of the cover of the furnace shown in Fig. 1.

Referring now to the accompanying drawings in detail, the furnace comprises an annular trough 1 made of suitable refractory material, which is insulated at the bottom and at the inner rim of the trough with heat resisting material, 2 the whole being supported by a metal plate 3 which is mounted upon the upper end of vertical shaft so that the trough can, by suitable means, be rotated about a vertical axis.

Over the trough 1 is arranged a cover 4 made of suitable insulating or heat resisting material, the said cover being suitably supported from the underside of a framework 5 and being built up so that it extends transversely across the trough in the form of an arch. There is thus formed on the underside of the cover an arcuate passage 6 which is located directly above the annular trough, the said passage being closed at its ends by blocks of refractory material abutting against the jack-arch 7 which is arranged so that it extends across one side of trough so as to provide an exposed gathering area 8 from which the glass is fed to the moulding machine.

In the arcuate passage 6 above referred to there is formed a plurality of heating chambers 9 arranged in spaced relationship along the length of the passage, each of such heating chambers being equipped with suitable means for heating the glass lying in the trough disposed therebeneath. In the arrangement illustrated, the heating means take the form of an electric heating element 10 of the resistance type, there being one of these elements arranged within each of the heating chambers so as to extend radially across the trough 1. It will be appreciated, however, that arc or induction heaters or even, gas, oil or other fuel burners, may, if desired, be used instead of the electrical resistance type heaters. The elements 10 are suitably supported in, and suitably insulated from the side walls of the cover 4 and leads 11 are provided for enabling the elements to be connected to a course of electric current, the arrangement preferably being such that the elements can, if desired, be independently controlled, or one or more of them short circuited or rendered inoperative, when desired so as to permit the temperature of the glass to be accurately controlled.

In the preferred mode of forming the cover 4 it is built up of an inner arcuate block 14, an outer arcuate block 15 and a series of curved or segmental blocks 16 arranged so that they extend across the trough and between the inner and outer blocks in two or more curved rows. The vertical inner faces of the blocks 14 and 15 are lined with a suitable refractory material indicated at 17 and the lower surfaces of the blocks 16 are also each lined with blocks 18 of refractory material, the under surfaces of the blocks 18 being preferably shaped to form the upper walls of the heating chambers 9 which extend radially across the trough. As may be seen from Figs. 5 and 6 the heating chambers 9 are provided by forming in the lower surfaces of the blocks 18 substantially semi-circular shaped grooves with curved or flared edges, this formation being adopted in order to assist the reflection of the heat downwardly upon the surface of the molten glass. The grooves extend transversely or radially across each pair of contiguous blocks and are preferably tapered so that their lower ends are substantially parallel with the end walls of the blocks.

In order to permit the vertical adjustment of the heating chambers the blocks 16 and 18 may be suspended from the framework 5 in such a manner that they can be raised or lowered relatively to the blocks 14 and 15. For this purpose each pair of blocks 16 and 18 is carried upon the lower end of a vertically movable rod or shaft 25 and each of the rods 25 is formed at its upper end with a screw threaded portion 26 co-operative with suitable raising and lowering means which may comprise an internally threaded nut 27 rotatably mounted upon each of the rods 25, a pinion 28 secured to each of the said nuts and a handwheel 29, the arrangement being such that a rotary movement of the handwheel will cause the two intermeshing pinions 28 and the nuts 27 to rotate with the result that the two blocks 18 which form the upper wall of one of the heating chambers are moved toward or away from the surface of the glass in the trough. As will be observed from Fig. 4, each heating chamber is equipped with its own raising and lowering means so that any one of the heating chambers may be raised or lowered independently of the other chambers. The blocks 16 and 18 may be carried upon the rods 25 by forming the lower ends of the latter with T-shaped parts engaging undercut recesses 30 (Fig. 5) formed in the blocks 18 and by passing the rods through suitable slots 31 formed in the blocks 16.

The heating chambers are arranged so that they extend over substantially one half of the trough and one of the chambers, for instance, that shown on the left hand side of Fig. 3, is made higher than the others and provided with an opening in its outer wall through which passes a feeding chute 33 for conducting or feeding the glass in trough 1, the said feeding chute being preferably provided with a cover of refractory material containing a suitable heating device to prevent chilling of the glass whilst flowing along the chute to the trough. The lower part of the block 15 may be fitted with the usual form of combustion plate 34.

As will be apparent to those skilled in the art many changes may be made in the construction illustrated without departing from the spirit and scope of the appended claims.

Having thus described this invention, what we claim as new therein, and desire to secure by Letters Patent, is:—

1. A glass furnace comprising a rotary annular trough for the molten glass, means for rotating the trough, a trough cover having an arcuate passage opening downwardly and arranged directly over the major portion of the said trough, a plurality of arch-shaped heating chambers arranged in spaced relationship and at regular intervals along the length of the said passage with their lower ends open and disposed above the glass in the trough, and means for enabling the spacing between the heating chambers and the upper surface of the glass in the trough to be varied, and a separate heating device located within each heating chamber.

2. A glass furnace comprising a rotary annular trough for the molten glass, means for rotating the trough, a trough cover built up of two parallel curved walls having between them an arcuate passage opening downwardly and arranged directly over the major portion of the said trough, a plurality of arch-shaped heating chambers arranged in spaced relationship and at regular intervals along the length of the said passage with their lower ends open and disposed above the glass in the trough, each of said chambers being formed by segmental blocks of refractory material which are suspended from the cover and are each formed with an arch-shaped groove in the under face thereof accommodating an electrical heating element, and means for raising and lowering the said blocks.

3. A glass furnace comprising an annular trough for the molten glass, means for feeding glass thereto, means for rotating the trough about a vertical axis, a cover enclosing the major portion of the upper side of the trough and formed to provide an exposed gathering area, said cover being built up of an inner arcuate block, an outer arcuate block and a series of segmental blocks arranged so that they extend across the trough and between the inner and outer blocks and so that an arcuate passage is formed directly over the major portion of the annular trough, and blocks of refractory material suspended from the under surfaces of the segmental blocks, said blocks of refractory material being formed with arch-shaped recesses in their under faces, said arch-shaped recesses being each equipped with means for heating the glass in the trough.

4. A glass furnace comprising an annular trough for the molten glass, means for feeding glass thereto, means for rotating the trough about a vertical axis, a cover enclosing the major portion of the upper side of the trough and formed to provide an exposed gathering area, said cover being built up of an inner arcuate block, an outer arcuate block and a series of segmental blocks arranged so that they extend across the trough and between the inner and outer blocks and so that an arcuate passage is formed directly over the major portion of the annular trough, blocks of refractory material suspended from the under surfaces of the segmental blocks, said blocks of refractory material being formed with arch-shaped recesses in their under faces, and means whereby the refractory blocks may be raised and lowered in the arcuate passage, said arch-shaped recesses being each equipped with an electrical heating element extending radially across the annular trough.

5. A cover for a rotary glass furnace comprising an inner arcuate wall, an outer arcuate wall spaced from the inner arcuate wall, the said walls being arranged so that they are parallel with one another and concentric with the glass furnace, a series of segmental blocks supported in position between the said inner and outer walls, a radial heating chamber in the lower face of each segmental block and glass heating means located within each heating chamber.

6. A cover for a rotary glass furnace comprising an inner arcuate wall, an outer arcuate wall spaced from the inner arcuate wall, the said walls being arranged so that they are parallel with one another and concentric with the glass furnace, a series of vertically movable segmental blocks supported in position between the said inner and outer walls, each of said segmental blocks being formed in its under face with an arch-shaped radially disposed groove, means for raising and lowering the said segmental blocks and glass heating means located within each heating chamber.

7. A cover for a rotary glass furnace comprising a pair of curved walls arranged parallel with one another so as to leave an arcuate space between them, a series of segmental blocks of refractory material substantially filling the said arcuate space, each of said blocks being formed in its under face with an arch-shaped radially disposed groove forming a heating chamber disposed close to the surface of the glass to be heated, and an independently controllable electric heating means arranged within each heating chamber.

8. A glass furnace comprising a rotary annular trough for the molten glass, means for rotating the trough, a trough cover having an arcuate passage opening downwardly and arranged directly over the major portion of the said trough, a plurality of heating chambers arranged in spaced relationship and at regular intervals along the length of the said passage so that they extend transversely across the annular trough with their lower ends open and disposed above the glass in the trough, a separate heating device located within each heating chamber and means for controlling the said heating devices.

THOMAS COURTNEY MOORSHEAD.
FRANCIS AUGUSTUS HURLBUT.